Figure 1:
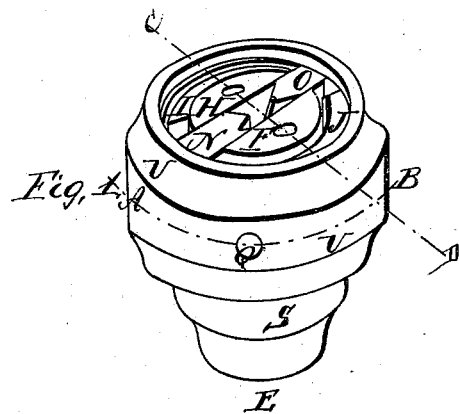
Figure 2:
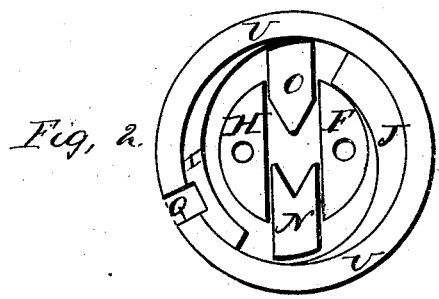
Figure 3:
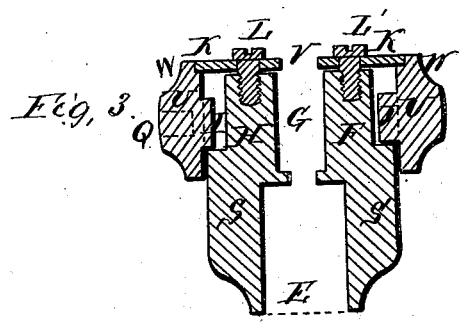

S. A. Morse,
Drill Centerer,

N°. 42,592.      Patented May. 3, 1864.

Witnesses;          Inventor;
Franklin Hunt          S. A. Morse
John M. Batchelder

UNITED STATES PATENT OFFICE.

STEPHEN A. MORSE, OF EAST BRIDGEWATER, MASSACHUSETTS.

IMPROVED COLLET.

Specification forming part of Letters Patent No. 42,592, dated May 3, 1864.

*To all whom it may concern:*

Be it known that I, STEPHEN AMBROSE MORSE, of East Bridgewater, in the county of Norfolk and State of Massachusetts, have invented an Improvement in Collets; and I do hereby declare that the following is a full and exact description thereof, reference being had to the accompanying drawings, making a part of this specification.

Figure I is a perspective view of the collet, the top plate being removed. Fig. II is a horizontal section on the line A B. Fig. III is a vertical section on the line C D.

My improvement is intended for holding a drill or other tool in a firm and fixed position, and causing the longitudinal axis of the drill to be coincident at all times with its axis of rotation. I am aware that tools have heretofore been constructed for this purpose, but they are difficult to adjust, and my improvement differs from them principally in this— viz., the jaws that come in contact with the drill on opposite sides are both movable, and are made to approach each other by the action of cams, so formed as to cause those parts of the jaws that are in contact with the drill to be equidistant from the center of the collet whatever may be the size of the drill. The shaft or spindle of the lathe in which the collet is to be used is screwed into the cavity E, Fig. III, where it is firmly held, and the whole of the collet, as shown in Figs. I, II, and III, revolves with the spindle. The part S, concentric with and surrounding the spindle, is divided by a deep rectangular slot, G, into two parts, H and F, within which two jaws, N and O, are caused to approach each other by means of two cams or scrolls, I and J, which form a part of the inner portion of the clamping U. The lower edges of these cams I and J rest and turn upon a shoulder made upon the part S, while a shoulder, W, at the upper edge of the ring V receives the circular disk or cap plate K, which is held in place by the screws L L′, the periphery of the plate forming a bearing upon which the ring revolves to a limited distance back and forth. In the center of the cap-plate K there is a hole, V, of sufficient size to admit the largest drill or tool that is to be used. The sliding jaws O and N, which are placed opposite to each other within the slot G, are of the same breadth, but are dissimilar in other respects, their lengths measured radially being unequal, and the shape of the parts that hold the tool or drill being different. The jaw O is the shortest, and has a V-shaped or pointed end, while that of the opposite jaw is Y-shaped, and is made longer, the cylindrical shank of the drill being in contact within the Y at two points, and in contact with the opposite jaw at one point only. The outer ends of the jaws are curved, so as to conform nearly to the shape of the inside of the cams. The cam J is the broadest, and at its widest part is nearer to the center of the collet than the opposite cam I, in order to increase the distance traversed by the Y-shaped jaw N. The form of the curve of the face of the cam throughout its whole extent is such as will retain the center or axis of the drill or other tool at the exact center of the collet, whether the jaws be nearly in contact for the purpose of holding a small drill, or wide apart to receive a large one. The inner ends of the jaws are countersunk or beveled at the top in order that the drill as it enters may readily force them apart. The ring or case U is turned by a short lever inserted in the hole Q, thus causing the cams to force the jaws toward each other, and hold the drill firmly at the exact center of rotation without previous adjustment, the partial revolution of the ring being all that is required to effect this, whether the diameter of the drill be large or small.

I claim—

In combination with the movable jaws, cams, and ring, the conjoined action and use of the V-shaped end of one of the jaws, and the single point of the opposite jaw, by means of which the drill is held firmly at three bearing-points, which are always equidistant from the center whether the drill-shank be large or small.

S. A. MORSE.

In presence of—
 B. W. KEITH,
 R. B. ALDEN.